April 6, 1937.  H. W. JESPERSEN  2,076,237
METHOD OF AND APPARATUS FOR HANDLING STRAND MATERIAL
Filed Jan. 10, 1935
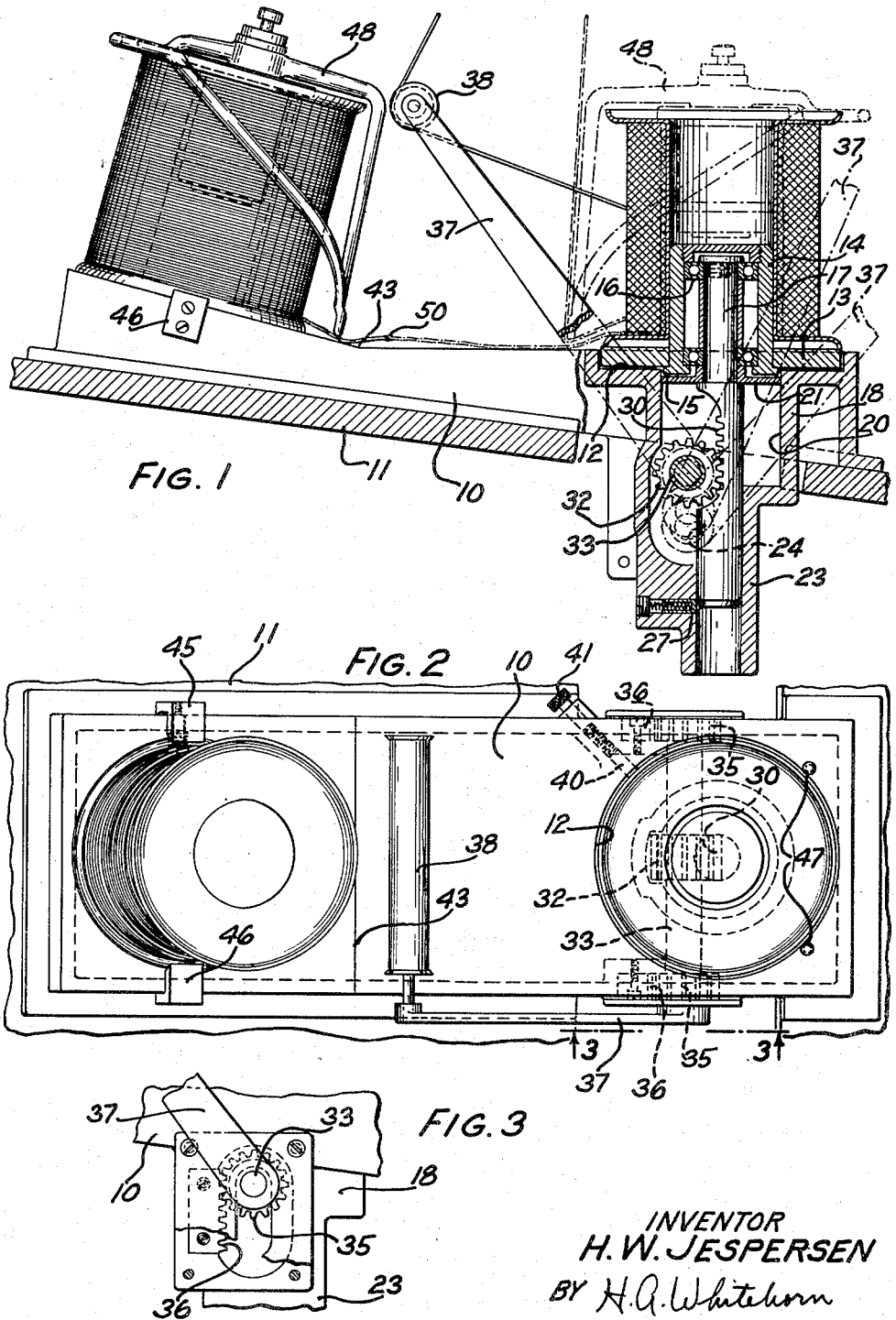
INVENTOR
H. W. JESPERSEN
BY H. Q. Whitehorn
ATTORNEY Patented Apr. 6, 1937

2,076,237

UNITED STATES PATENT OFFICE 2,076,237

METHOD OF AND APPARATUS FOR HANDLING STRAND MATERIAL

Helgo W. Jespersen, Western Springs, Ill., assignor to Western Electric Company, Incorporated, New York, N. Y., a corporation of New York Application January 10, 1935, Serial No. 1,163

9 Claims. (Cl. 242—128)

This invention relates to a method of and apparatus for handling strand material, and more particularly to a method of and apparatus for continuously feeding strand material from supply spools.

Objects of the invention are to provide a simple, efficient and practical method of and apparatus for handling strand material and for feeding it continuously from a series of supply sources.

In accordance with the objects, one embodiment of the invention contemplates a strand unwinding apparatus, particularly for continuously feeding strand material from supply spools, comprising a spool holder adapted to permit rotation of the supply spool to unwind the strand material therefrom and arranged so that the spool, when nearly empty, may be held stationary to permit the brazing of the inner end of the strand material to the outer end of the strand material on a full spool, during which time the strand material is unwound from the stationary spool by means of a flyer.

Other objects and advantages of the invention will be apparent from the following detailed description taken in conjunction with the accompanying drawing, wherein Fig. 1 is a side elevational view, partly in section, of an apparatus embodying the features of the invention;

Fig. 2 is a top plan view of the apparatus, and

Fig. 3 is a detail view taken on line 3—3 of Fig. 2.

Referring now to the drawing, numeral 10 designates a base mounted upon a bench 11, or any other suitable support. In the present instance, the base is a casting rectangular in general contour and having a circular depressed portion 12 for receiving an annular spool supporting member 13. A rotatable arbor 14 is vertically slidable in a central aperture in the annular support 13 and has an outwardly projecting supporting flange 15 at its lower end for supporting the annular support 13 when the arbor is in its uppermost position, as shown in Fig. 1. The arbor 14 is mounted by means of bearings 16 upon a spindle 17, the spindle extending downwardly through a housing 18 which forms a part of the base 10. The housing 18 is hollowed out at 20 to provide a cylindrical recess for receiving the arbor when it is moved downwardly as hereinafter described.

A guide ring 21 extending around the spindle 17 and fixed thereto has its peripheral surface disposed in sliding engagement with the inner wall of the cylinder 20, to guide the arbor in its vertical movement. The lower end of the spindle is journaled in a bearing portion 23 of the housing 18 and in this portion of the spindle a notch 24 is formed for receiving a spring pressed plunger 27 to hold the spindle in an intermediate position as hereinafter described. The spindle 17 is cut away, intermediate its ends, as illustrated in Fig. 1 and gear teeth 30 are formed therein. A gear 32 interengages the teeth 30 of the spindle 17, the gear being mounted upon or integral with a shaft 33 which extends horizontally through the housing 18 and is suitably journaled therein. The shaft 33 is reduced at each end and pinions 35 are mounted upon and fixed to these reduced portions. Toothed racks 36 are secured to the housing 18 in positions parallel to each other and in planes parallel to the plane of the toothed portion 30 of the spindle 17, the teeth of the racks 36 interengaging their respective pinion 35. An arm 37 which rotatably supports a roller 38 at its upper end has its lower end keyed to one end of the shaft 33 so that arcuate movement of the arm will cause a rotary movement of the shaft 33.

A friction brake 40 in the form of a spring pressed plunger the pressure of which is variable by the adjustment of a screw 41 is positioned to engage the peripheral surface of the spool support 13 for a purpose described hereinafter.

As illustrated in Fig. 1, the bench 11 is positioned at a slight angle and the upper surfaces of the base 10 extending in opposite directions from a line 43 extend angularly with respect to the bench so that lines passing from the centers of spools of strand material supported by these surfaces to the receiving side of a pulley over which the strand material is fed will intercept their respective surfaces at right angles. The purpose of positioning the upper surfaces of the base in this manner is to make it possible to remove the strand material easily from the spools during the time they are held against rotation.

A spring pressed clamp 45 is used in conjunction with a stationary clamp 46 for holding a spool of strand material upon the base prior to the time it is moved on the arbor. Stop pins 47 mounted in the upper surface of the base 10 in the position shown in Fig. 2 are for the purpose of aligning the hub of a spool with the arbor 14 during the transferring of a full spool from a position at the left (Fig. 1) to the position above the arbor.

The operation of the apparatus may be more clearly understood if a definite example is given for the use of the apparatus. Let it be assumed, therefore, that the apparatus is used in conjunction with a wire coating apparatus for the purpose of continuously feeding wire thereto. In starting the apparatus, a spool of wire is placed upon the arbor 14 and the forward end of the wire is passed beneath the roller 38, as illustrated in Fig. 1, and from there it is passed over a pulley leading to the coating apparatus (not shown). While the apparatus is in the position shown in Fig. 1, the arbor is free to rotate, rotating with it the annular support 13 which allows the spool to rotate as the wire is removed therefrom. The purpose of the friction brake 40 is to prevent the spool from rotating faster than is necessary for the removal of the wire. During the removing of the wire from the spool on the arbor, a full spool is mounted upon the base 10 between the clamps 45 and 46 so that the outer end of the wire thereupon may be brazed or secured in any other suitable manner to the inner end of the wire on the spool which is on the arbor.

Just before the wire is completely removed from the spool on the arbor, flyers bearing reference numerals 48 are inserted in the upper ends of the spools so that the wire may be readily removed therefrom when the spools are not rotating. The construction of the flyers 48, is not shown in detail nor described specifically as any suitable type may be employed, reference being made to the patent to J. N. Selvig 1,677,217 of July 18, 1928, which shows a flyer of the type which might be employed. After the flyers are inserted in the spools, the arm 37 with the roller 38 is swung from the position shown in solid lines in Fig. 1 to the first position shown in dotted lines. During this movement of the arm 37, the shaft 33 is rotated clockwise, rotating the gear 32 to cause a downward movement of the spindle 17 with the arbor 14 and at the same time the pinions 35 are rotated; and due to their engagement with the racks 36, a further downward movement is imparted to the spindle and the arbor. The downward movement of the arbor 14 will cause the annular support 13 to rest upon the upper surface of the depressed portion 12 where the support together with the spool will be held against rotation. At this position the upper end of the arbor 14 remains slightly above the upper surface of the base 10 so as to hold the spool in position during the brazing of the ends of the wires and the removal of the remainder of the wire from the spool.

When the roller 38 on the arm 37 is moved to the first dotted line position, it is moved out of engagement with the wire, allowing the wire to engage the flyer 48 and be assisted thereby during its continued removal from the spool. During this time, the outer end of the wire from the full spool is brazed to the inner end of the wire from the spool on the arbor, as indicated at 50 (Fig. 1).

As soon as the wire is removed from the spool on the arbor, the arm 37 is swung a further distance in a clockwise direction to the other dotted line position shown in Fig. 1, thus positioning the upper surface of the arbor 14 flush with the adjacent surface of the base 10, making it possible to remove the empty spool and then move the full spool in place in engagement with the stop pins 47. The arm 37 is then swung in a counterclockwise direction to its full line position (shown in Fig. 1) causing the rotation of the shaft 33, which through the connection of the gear 32 with the teeth of the spindle 17 will move the spindle and the arbor upwardly into the hub of the full spool, this movement being aided by the rotation of the pinions 35, while interengaging the racks 36. As soon as the arbor reaches its uppermost position, the annular support 13 is supported by the flange 15 and is free to rotate with the spool. The roller 38, while moving in a counterclockwise direction with the arm 37, engages the wire from the new or full spool, removing it from the flyer and causing the spool to rotate as the wire is removed therefrom. At this time the operator may remove the flyer from the spool, the flyer being needed only during the connecting of the ends of the wires and during the placing of a full spool upon the arbor. The purpose of the plunger 27 is to hold the arbor in the upper or rotating position, and in the first lower or brazing position. When the arbor is in its uppermost position, the plunger 27 engages the beveled lower end of the arbor as shown in Fig. 1, and when the arbor is in the first lower or intermediate position the plunger engages the notch 24 in the arbor. The weight of the parts is sufficient to hold the arbor in the lowermost position.

By the apparatus of the present invention, the supply spools are free to rotate while supplying wire except during the short interval of time while changing from an empty spool to a full spool. This is advantageous since it has been found that fewer wire breaks occur when feeding wire from a rotating spool than when withdrawing wire from a stationary spool by means of a flyer.

For clarity it may be emphasized that one aspect of the invention is the successive use of two different methods of taking strand material from a wound supply. During the first phase of the operation the strand is withdrawn in a straight line from the freely rotating supply which is driven in rotation by the pull of the strand. During the second phase the strand is unwound from the stationary supply by revolving the strand about the supply. By this invention it is possible to keep a continuous feed going and at the same time to take off the greater part of the material by the preferable mode of straight line withdrawal, and only a minor part by unwinding by revolving the material about a stationary supply.

It is to be understood that the invention is not limited to the particular embodiment thereof herein illustrated and described, except in so far as is defined by the appended claims.

What is claimed is:

1. A method of taking material from supply spools, which comprises rotating a supply spool while withdrawing a portion of the material therefrom without revolving the material about the spool, then holding the spool stationary while unwinding another portion of the material therefrom by revolving the same about the spool, and connecting the inner end of the material on said spool to the outer end of the material on another spool while said remaining material is unwound from the first spool.

2. A method of taking material continuously from a series of supply spools, which comprises rotating a supply spool while withdrawing nearly all of the material therefrom without revolving the material about the spool, then holding the spool stationary while unwinding the remaining material therefrom by revolving the same about the spool, connecting the inner end of said remaining material to the material on a full spool while said remaining material is unwound from the first spool, and replacing the first spool when empty with the full spool without interrupting the continuous withdrawal of the material.

3. In an apparatus for handling strand material, normally freely rotatable strand supply supporting means movable into two positions, said supporting means being free to rotate in one of said positions, means for preventing rotation of said supporting means in the other of said positions, means for moving said supporting means comprising a pivotal member having a gear connection with the supporting means, and strand guiding means carried by said pivotal member.

4. In an apparatus for handling strand material, normally freely rotatable strand supply supporting means movable into two positions, said supporting means being free to be rotated in one of said positions by the withdrawal in a straight line of strand material from a supply mounted thereon, means for preventing rotation of said supporting means in the other of said positions, and rotatable means for unwinding strand material from said supply by revolving the material about the supply when said supporting means is in said latter position.

5. In an apparatus for handling strand material, a strand supply device movable into two positions and free to be rotated in one of said positions by the withdrawal of strand material therefrom, a movable material guiding means associated with said supply device, means responsive to a movement of said guiding means for moving said supply device to the other of said positions, and means for restraining rotation of said supply device when in said latter position.

6. In an apparatus for handling strand material, a normally freely rotatable strand supply device movable into two positions and free to be rotated in one of said positions by the withdrawal in a straight line of strand material therefrom, a movable material guiding means associated with said supply device, means responsive to a movement of said guiding means for moving said supply device to the other of said positions, means for preventing rotation of said supply device when in said latter position, and rotatable means for unwinding material from said supply device by revolving the material about the supply when in said latter position.

7. In an apparatus for taking off material from supply spools, normally freely rotatable supply spool supporting means movable into either of two positions and freely rotatable in one such position by the withdrawal of material from a spool thereon without revolving the material about the spool, means to prevent rotation of the spool supporting means while in the other position thereof, and rotatable means to guide material being unwound from the spool by revolving the material about the spool when the supply means is in the second position.

8. In an apparatus for taking off material from supply spools, normally freely rotatable supply spool supporting means movable into either of two positions and freely rotatable in one such position by the withdrawal of material from a spool thereon without revolving the material about the spool, means to prevent rotation of the spool supporting means while in the other position thereof, and removable means to guide material being unwound from the spool by revolving the material about the spool when the supply means is in the second position.

9. In an apparatus for taking off material from supply spools, normally freely rotatable supply spool supporting means movable into either of two positions and freely rotatable in one such position by the withdrawal of material from a spool thereon without revolving the material about the spool, means to prevent rotation of the spool supporting means while in the other position thereof, and removable rotatable means to guide material being unwound from the spool by revolving the material about the spool when the supply means is in the second position.

HELGO W. JESPERSEN.